US012560907B2

(12) United States Patent
Uenishi et al.

(10) Patent No.: US 12,560,907 B2
(45) Date of Patent: *Feb. 24, 2026

(54) NUMERICAL VALUE CONTROLLER

(71) Applicant: FANUC CORPORATION, Yamanashi (JP)

(72) Inventors: Daisuke Uenishi, Yamanashi (JP); Tomohiro Oyamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 385 days.

This patent is subject to a terminal disclaimer.

(21) Appl. No.: 18/004,509

(22) PCT Filed: Aug. 27, 2021

(86) PCT No.: PCT/JP2021/031511
§ 371 (c)(1),
(2) Date: Jan. 6, 2023

(87) PCT Pub. No.: WO2022/045292
PCT Pub. Date: Mar. 3, 2022

(65) Prior Publication Data
US 2023/0251627 A1      Aug. 10, 2023

(30) Foreign Application Priority Data
Aug. 28, 2020      (JP) ................................. 2020-144507

(51) Int. Cl.
*G05B 19/4103* (2006.01)
*G05B 19/416* (2006.01)

(52) U.S. Cl.
CPC ..... *G05B 19/4103* (2013.01); *G05B 19/4163* (2013.01); *G05B 2219/49363* (2013.01)

(58) Field of Classification Search
None
See application file for complete search history.

(56) References Cited

U.S. PATENT DOCUMENTS 5,267,620 A * 12/1993 Lee .......................... E21B 23/02
175/246
5,888,037 A * 3/1999 Fujimoto ............. G05B 19/416
408/1 R
(Continued)

FOREIGN PATENT DOCUMENTS

| JP | S63005410 A | 1/1988 |
| JP | S6427838 A | 1/1989 |

(Continued)

OTHER PUBLICATIONS

International Search Report issued on Nov. 2, 2021, in corresponding International Application No. PCT/JP2021/031511, 12 pages.

*Primary Examiner* — Hua Lu
(74) *Attorney, Agent, or Firm* — Maier & Maier, PLLC

(57) ABSTRACT

A numerical value controller includes a storage unit that stores a machining program involving executing a plurality of canned cycles each including a first operation for positioning a drilling position of a workpiece relative to a tool, a second operation for moving the tool from a return point to a hole bottom point, and a third operation for moving the tool from the hole bottom point to the return point; a control unit that controls movement between the tool and the workpiece based on the machining program and that moves the tool along curved paths by starting the second operation before the first operation ends and starting the first operation in a subsequent canned cycle before the third operation ends; a distance calculating unit that calculates a retraction distance; and a curvature calculating unit that reads a positioning command for the drilling position for the subsequent canned cycle.

6 Claims, 6 Drawing Sheets

(56)        References Cited

U.S. PATENT DOCUMENTS

| | | | | |
|---|---|---|---|---|
| 6,671,573 | B2 * | 12/2003 | Nigazawa | G05B 19/414 |
| | | | | 700/193 |
| 7,239,938 | B2 * | 7/2007 | Otsuki | G05B 19/4061 |
| | | | | 700/189 |
| 8,000,833 | B2 * | 8/2011 | Chiu | G05B 19/188 |
| | | | | 83/284 |
| 9,280,150 | B2 * | 3/2016 | Sato | G05B 19/4166 |
| 9,639,079 | B2 * | 5/2017 | Sakai | G05B 19/408 |
| 10,976,716 | B2 * | 4/2021 | Peters | G05B 19/19 |
| 2003/0170085 | A1 * | 9/2003 | Kakino | G05B 19/40937 |
| | | | | 409/132 |
| 2006/0184278 | A1 * | 8/2006 | Nihei | B25J 9/1664 |
| | | | | 700/245 |
| 2007/0048098 | A1 * | 3/2007 | Bone | B23B 41/12 |
| | | | | 408/1 R |
| 2007/0258777 | A1 * | 11/2007 | Gunther | B23C 5/10 |
| | | | | 407/113 |
| 2010/0158623 | A1 * | 6/2010 | Danielsson | B23B 51/0486 |
| | | | | 408/83 |
| 2014/0227043 | A1 * | 8/2014 | Seegmiller | E21B 10/32 |
| | | | | 175/57 |
| 2014/0379115 | A1 * | 12/2014 | Koyanaka | G05B 19/4166 |
| | | | | 700/159 |
| 2016/0103446 | A1 * | 4/2016 | Aizawa | G05B 19/416 |
| | | | | 700/188 |
| 2016/0274566 | A1 * | 9/2016 | Brambs | G05B 19/402 |
| 2016/0303661 | A1 * | 10/2016 | Rooney | B23B 47/281 |
| 2017/0269576 | A1 * | 9/2017 | Oonishi | G05B 19/416 |
| 2018/0079043 | A1 * | 3/2018 | Inoue | G05B 19/29 |
| 2023/0094117 | A1 * | 3/2023 | Kopton | B23G 5/20 |
| | | | | 408/1 R |
| 2023/0236574 | A1 | 7/2023 | Uenishi et al. | |

FOREIGN PATENT DOCUMENTS

| | | |
|---|---|---|
| JP | H01108604 A | 4/1989 |
| JP | H08118048 A | 5/1996 |
| JP | H09-120310 A | 5/1997 |
| JP | H11305819 A | 11/1999 |
| JP | 2000167716 A | 6/2000 |
| JP | 2006-099347 A | 4/2006 |
| JP | 2008-046899 A | 2/2008 |
| JP | 2009053926 A | 3/2009 |
| JP | 2016-038617 A | 3/2016 |
| JP | 2017-004300 A | 1/2017 |
| JP | 2018-140470 A | 9/2018 |
| JP | 2020067921 A | 4/2020 |
| JP | 2021012522 A | 2/2021 |
| JP | 2021064363 A | 4/2021 |
| JP | 2021076955 A | 5/2021 |
| WO | 97/015874 A1 | 5/1997 |
| WO | 2018/042704 A1 | 3/2018 |

* cited by examiner

NUMERICAL VALUE CONTROLLER

TECHNICAL FIELD

The present invention relates to numerical value controllers.

BACKGROUND

A known control method for a machine tool in the related art achieves a high-speed drilling process by optimizing a path along which a tool moves relative to a workpiece (for example, see Japanese Unexamined Patent Application, Publication No. Hei 09-120310). If the path has discontinuous points, such as corners, the tool pauses relative to the workpiece at each discontinuous point. In the case of the drilling process in Japanese Unexamined Patent Application, Publication No. Hei 09-120310, vertical movement of the tool and horizontal movement of the workpiece are temporally overlapped with each other, so that the movement path of the tool at each corner is made into a circular-arc-like curved path, thereby enabling continuous movement of the tool.

SUMMARY

An aspect of the present disclosure provides a numerical value controller for a machine tool that relatively moves a tool and a workpiece in a first direction and a second direction so as to drill a hole in the workpiece by using the tool. The first direction extends along a longitudinal axis of the tool. The second direction intersects the longitudinal axis of the tool. The numerical value controller includes a storage unit, a control unit, a distance calculating unit, and a curvature calculating unit. The storage unit stores a machining program that involves executing a plurality of canned cycles. Each of the plurality of canned cycles includes a first operation, a second operation, and a third operation. The first operation involves relatively moving the tool and the workpiece in the second direction so as to position a drilling position of the workpiece relative to the tool. The second operation involves relatively moving the tool and the workpiece in the first direction so as to move the tool from a return point retracted from the workpiece in the first direction to a hole bottom point. The third operation involves relatively moving the tool and the workpiece in the first direction so as to move the tool from the hole bottom point to the return point. The control unit controls the relative movement between the tool and the workpiece based on the machining program. The control unit moves the tool along a first curved path by starting the second operation before the first operation ends, and moves the tool along a second curved path by starting the first operation in a subsequent canned cycle before the third operation ends. The distance calculating unit calculates a retraction distance from the workpiece to the return point in the first direction. The curvature calculating unit calculates an amount of curvature of each of the first curved path and the second curved path. The curvature calculating unit reads a positioning command for the drilling position for the subsequent canned cycle from the machining program before the third operation starts, and calculates the amount of curvature of each of the first curved path and the second curved path for the subsequent canned cycle based on the read positioning command and the retraction distance. The control unit moves the tool in the subsequent canned cycle along the first curved path and the second curved path each having the amount of curvature calculated by the curvature calculating unit.

BRIEF DESCRIPTION OF THE DRAWINGS

FIG. 5 illustrates a modification of the drilling canned cycle program.

DETAILED DESCRIPTION OF THE EMBODIMENTS

A numerical value controller according to an embodiment will be described below with reference to the drawings.

Figure 1:
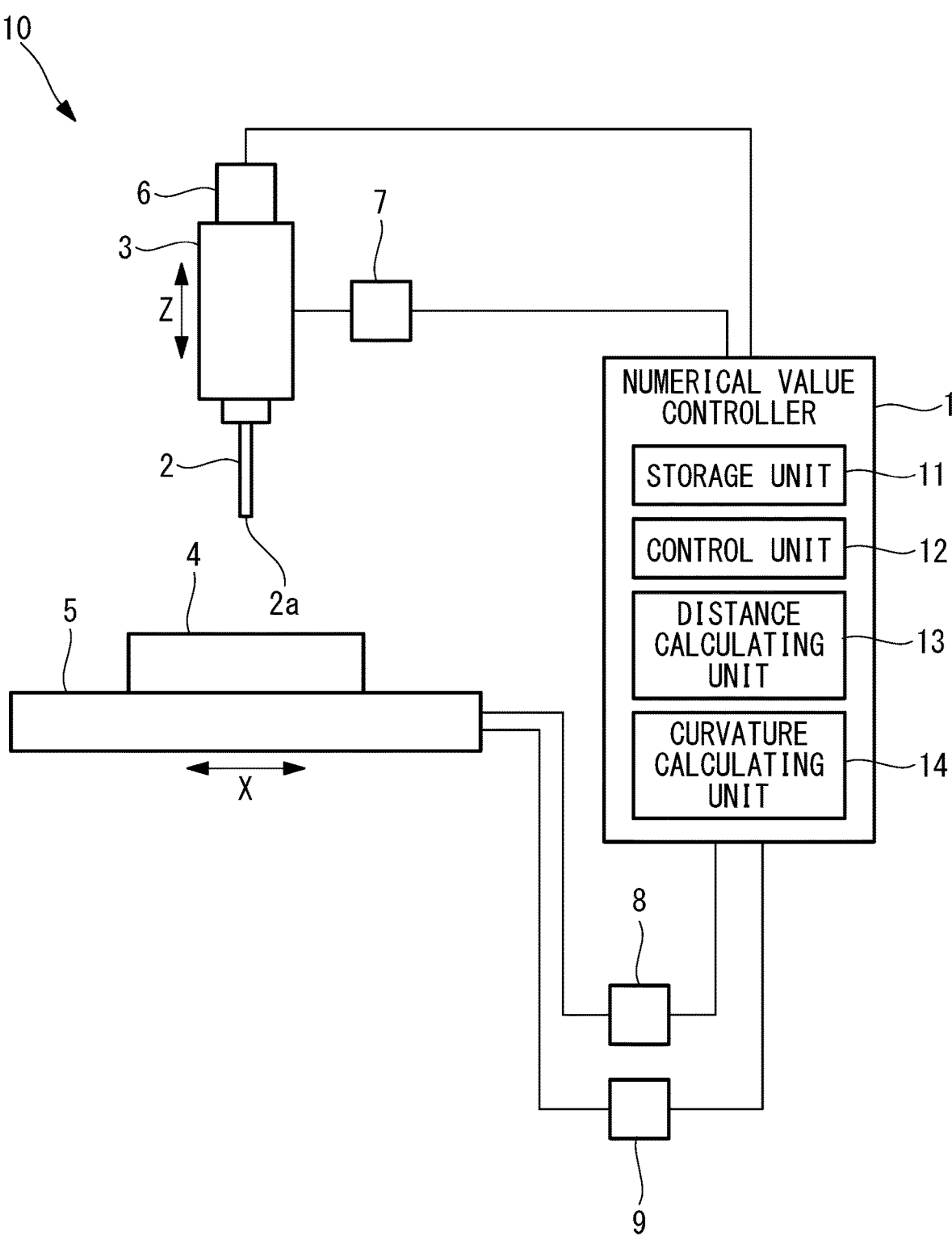
FIG. 1 illustrates the configuration of a machine tool according to an embodiment.

As shown in FIG. 1, a numerical value controller 1 is for a machine tool 10 that machines a workpiece 4 by using a tool 2.

The machine tool 10 includes a spindle 3 that holds the tool 2, a table 5 that holds the workpiece 4, a spindle motor 6 that rotates the spindle 3 around the longitudinal axis of the spindle 3, a Z-axis feed motor 7 that moves the spindle 3 in a Z direction (second direction) relative to the table 5, an X-axis feed motor 8 and a Y-axis feed motor 9 that move the table 5 in an X direction (first direction) and a Y direction (first direction), respectively, relative to the spindle 3, and the numerical value controller 1 that controls the motors 6, 7, 8, and 9.

The Z direction extends along the longitudinal axis of the tool 2 held by the spindle 3. The X direction and the Y direction are orthogonal to the longitudinal axis of the tool 2 held by the spindle 3 and are orthogonal to each other. In the machine tool 10 in FIG. 1, the Z direction extends vertically, whereas the X direction and the Y direction extend horizontally.

The spindle 3 is disposed in the vertical direction and is supported by a support mechanism (not shown) in such a manner as to be vertically movable. The tool 2 is held coaxially with the spindle 3 by a lower end of the spindle 3 and rotates and moves together with the spindle 3. The tool 2 is a drill that forms a hole 4a in the workpiece 4 in the depth direction (Z direction) thereof. The tool 2 may alternatively be another type of tool for machining the workpiece 4 in the depth direction, and may be, for example, a milling cutter or an end mill.

The table 5 is disposed horizontally below the spindle 3. The workpiece 4 placed on the upper surface of the table 5 is fixed to the table 5 by using a jig (not shown).

The spindle motor 6 is connected to the upper end of the spindle 3 and rotates the spindle 3 around the longitudinal axis of the spindle 3.

The feed motors 7, 8, and 9 are servomotors.

The numerical value controller 1 includes a storage unit 11, a control unit 12, a distance calculating unit 13, and a curvature calculating unit 14.

The storage unit 11 has, for example, a RAM, a ROM, and another storage device, and stores a machining program 11a (see FIG. 2) for drilling a hole in the workpiece 4 in accordance with relative movement between the tool 2 and the workpiece 4.

The numerical value controller 1 has a processor, such as a central processing unit. The control unit 12, the distance calculating unit 13, and the curvature calculating unit 14 are implemented by the processor.

Figures 2, 3:
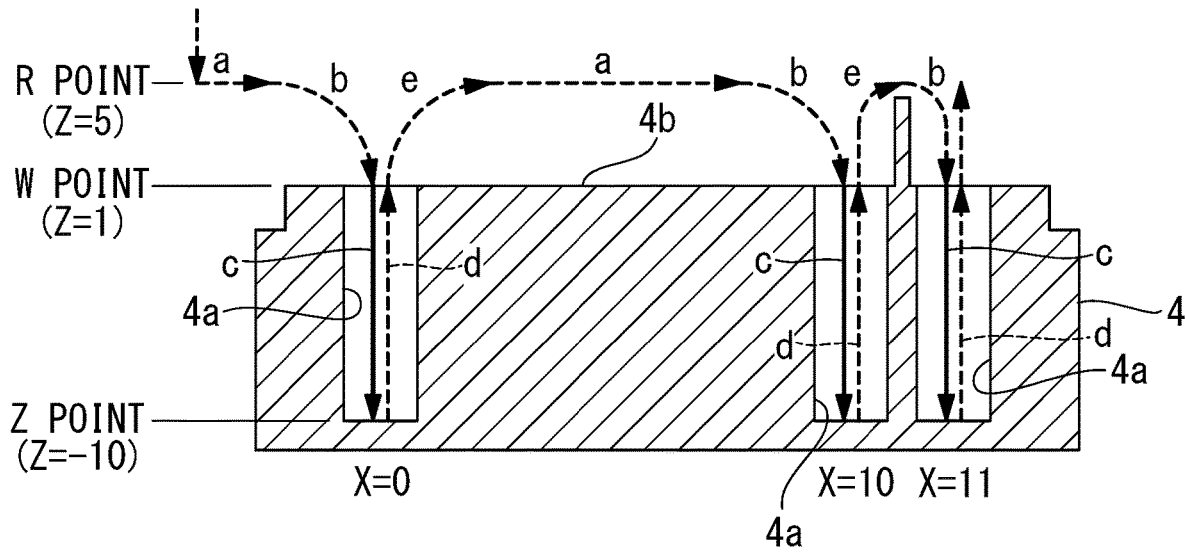
FIG. 2 illustrates an example of a drilling canned cycle program.
FIG. 3 illustrates an example of a drilling process according to a drilling canned cycle.

As shown in FIG. 2, the machining program 11a includes a drilling canned cycle program 11b. As shown in FIG. 3, the canned cycle program 11b causes the machine tool 10 to execute a canned cycle including four operations multiple times. In FIG. 3, dashed and solid arrows each indicate a path along which the tool 2 moves relative to the workpiece 4. In FIG. 3, the horizontal direction is the X direction, the direction orthogonal to the plane of the drawing is the Y direction, and the vertical direction is the Z direction.

In FIG. 3, a path along which the tool 2 moves at a rapid traverse rate relative to the workpiece 4 is indicated with a dashed line, and a path along which the tool 2 moves at a cutting feed rate relative to the workpiece 4 is indicated with a solid line. The rapid traverse rate is the maximum rate of each of the feed motors 7, 8, and 9. The cutting feed rate is a rate suitable for the tool 2 to drill a hole in the workpiece 4 and is a command rate set in the machining program.

The machining program 11a includes commands for designating a W point (workpiece height point), an R point (return point), and a Z point (hole bottom point). The W point is the position of a workpiece surface 4b in the Z direction. The workpiece surface 4b is the surface of the workpiece 4 from where the tool 2 starts to perform a drilling (cutting) process on the workpiece 4, and is the upper surface of the workpiece 4 in this embodiment. The R point is the position, in the Z direction, retracted in the Z direction from the workpiece surface 4b, and is located away from the workpiece surface 4b by, for example, 1 mm to 5 mm. The Z point is the position of the bottom of the hole 4a in the Z direction and is located opposite from the R point relative to the workpiece surface 4b.

The first operation involves moving the workpiece 4 in the XY direction relative to the tool 2 by moving the table 5 in the XY direction, so as to position a drilling position of the workpiece 4 in the XY direction relative to the tool 2. Paths a, b, and e are the paths of the tool 2 in the first operation.

The second operation involves moving a tip 2a of the tool 2 in the Z direction from the R point to the Z point by lowering the spindle 3 in the Z direction, so as to drill a hole in the drilling position of the workpiece 4. Paths b and c are the paths of the tool 2 in the second operation.

The third operation involves moving the tip 2a of the tool 2 in the Z direction from the Z point to the R point by raising the spindle 3 in the Z direction, so as to remove the tool 2 from the hole 4a. Paths d and e are the paths of the tool 2 in the third operation.

FIG. 2 illustrates an example of the canned cycle program 11b that involves repeating the canned cycle three times.

"G81" is a command code for executing the drilling canned cycle, "G99" is a command code for returning to the R point, and "G80" is a command code for canceling the canned cycle. "X0 Y0" is a positioning command for positioning the drilling position in the X direction and the Y direction, "Z-10" is a command for the Z point, "R5." is a command for the R point, "W1." is a command for the W point, and "F1000" is a command for the cutting feed rate. Specifically, the R point is set to Z=5 mm, the Z point is set to Z=−10 mm, and the W point is set to Z=1 mm. In the second and third rows, the commands Y, Z, R, W, and F whose command values are identical to those in the first row are omitted.

The control unit 12 controls the movement of the spindle 3 in the Z direction by controlling the feed motor 7, thereby controlling the movement of the tool 2 in the Z direction. Furthermore, the control unit 12 controls the movement of the table 5 in the XY direction by controlling the feed motors 8 and 9, thereby controlling the movement of the workpiece 4 in the XY direction.

The control unit 12 controls the feed motors 7, 8, and 9 based on the machining program 11a, so as to cause the machine tool 10 to execute the first operation, the second operation, and the third operation.

The control unit 12 starts the second operation before the first operation ends, so as to cause the movement of the workpiece 4 in the XY direction in the first operation and the movement of the tool 2 in the Z direction in the second operation to temporally overlap each other. Consequently, the tip 2a of the tool 2 moves along a second curved path b from the R point to the W point.

Furthermore, the control unit 12 starts the first operation in a subsequent canned cycle before the third operation ends, so as to cause the movement of the tool 2 in the Z direction in the third operation and the movement of the workpiece 4 in the XY direction in the first operation to temporally overlap each other. Consequently, the tip 2a of the tool 2 moves along a first curved path e from the W point to the R point.

The distance calculating unit 13 calculates the distance between the W point and the R point in the Z direction as a retraction distance from the workpiece 4 to the R point in the Z direction. In detail, the distance calculating unit 13 reads the machining program 11a from the storage unit 11, acquires the command values for the R point and the W point from the canned cycle program 11b, and calculates a difference |R−W| between the command values. The retraction distance |R−W| is a maximum radius of curvature r of the curved path b.

The curvature calculating unit 14 reads a positioning command for a subsequent canned cycle from the canned cycle program 11b before the third operation starts, and calculates a radius of curvature rn (n=2, 3) of each of the curved paths b and e for the subsequent canned cycle based on the read positioning command.

In detail, the curvature calculating unit 14 calculates a movement distance Ln from command values $X_{n-1}$ and $Y_{n-1}$ of the positioning command for the current canned cycle and command values $X_n$ and $Y_n$ of the positioning command for the subsequent canned cycle. The movement distance Ln is the distance by which the tool 2 moves in the XY direction from the drilling position in the current canned cycle to the drilling position in the subsequent canned cycle, and is calculated from the following expression.

$$Ln = \{(X_{n-1}-X_n)^2 + (Y_{n-1}-Y_n)^2\}^{1/2}$$

Subsequently, the curvature calculating unit 14 calculates the radius of curvature rn based on the movement distance Ln and the retraction distance |R−W|. Specifically, if half of Ln is greater than or equal to |R−W|, the curvature calculating unit 14 calculates the maximum radius of curvature r as the radius of curvature rn. If half of Ln is smaller than |R−W|, the curvature calculating unit 14 calculates half of Ln as the radius of curvature rn.

The control unit 12 controls the start timing for lowering the tool 2 in the second operation based on the radius of curvature rn, so as to move the tip 2a of the tool 2 along the curved path b having the radius of curvature rn.

Moreover, the control unit 12 controls the start timing for moving the workpiece 4 in the first operation based on the radius of curvature rn, so as to move the tip 2a of the tool 2 along the curved path e having the radius of curvature rn.

Figure 4:
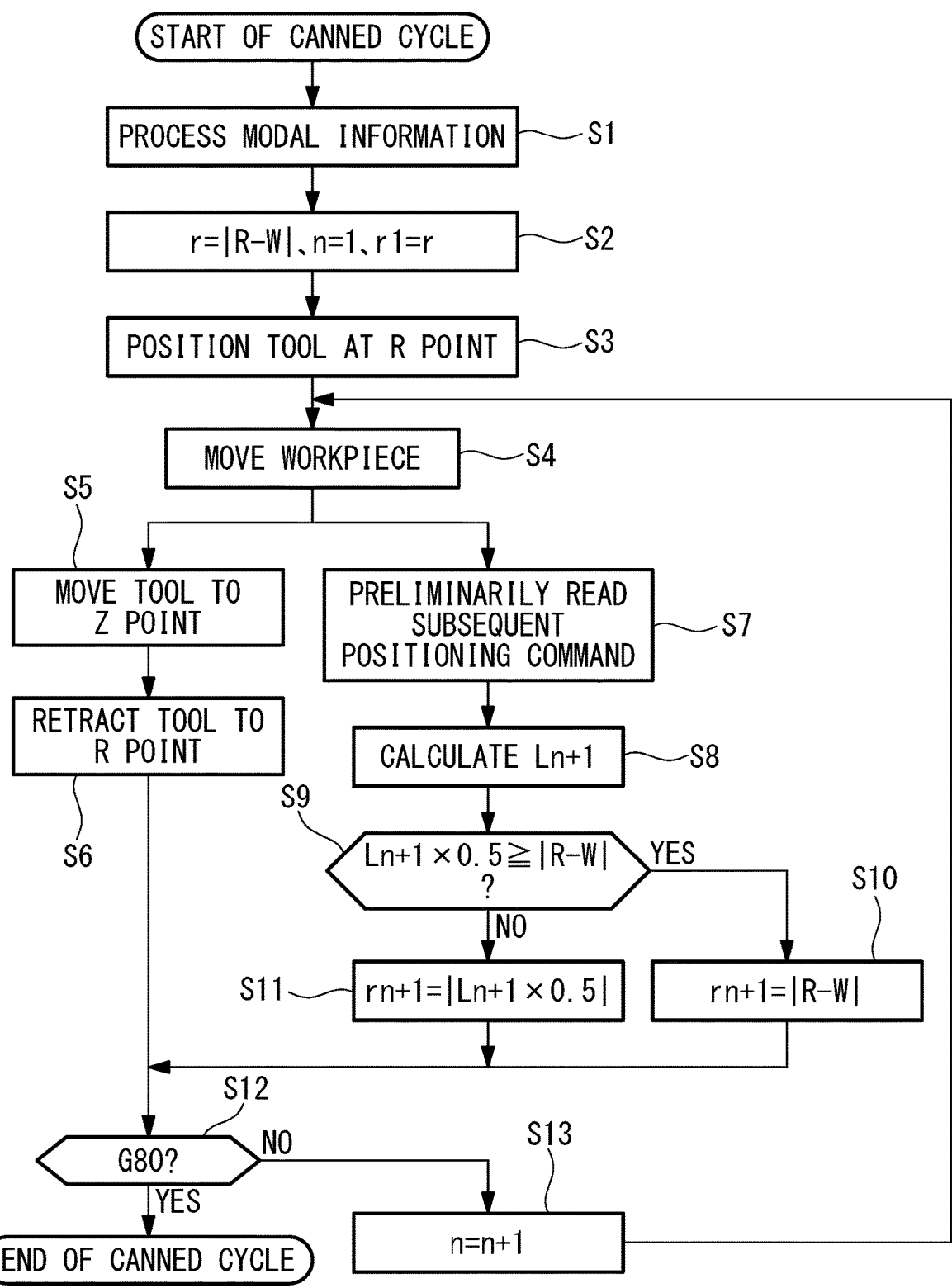
FIG. 4 is a flowchart illustrating a machine-tool control method.

Next, a method of how the numerical value controller 1 controls the machine tool 10 will be described with reference to FIG. 4.

When the canned cycle program 11b commences, the numerical value controller 1 first processes modal information, such as the R point, the Z point, the command rate, and the operation mode (step S1).

Then, the distance calculating unit 13 acquires the command values for the R point and the W point from the drilling machining program 11a and calculates the retraction distance |R−W| serving as the maximum radius of curvature r of each of the curved paths b and e (step S2).

When the canned cycle program 11b commences, the tip 2a of the tool 2 is located at an initial point retracted from the workpiece 4 relative to the R point. Therefore, the control unit 12 lowers the spindle 3 by controlling the feed motor 7, so as to move the tip 2a of the tool 2 to the R point (step S3).

Subsequently, the control unit 12 causes the machine tool 10 to execute a first canned cycle (step S4 to step S6). Specifically, the control unit 12 causes the table 5 to start executing the first operation by controlling the feed motors 8 and 9 (step S4), and positions a first drilling position of the workpiece 4 relative to the tool 2.

Subsequently, the control unit 12 causes the spindle 3 to start executing the second operation by controlling the feed motor 7 (step S5), and causes the tool 2 to drill a hole in the first drilling position. In this case, the control unit 12 starts the second operation before the first operation ends, thereby moving the tip 2a of the tool 2 along the curved path b.

Upon completion of the second operation, the control unit 12 causes the spindle 3 to start executing the third operation by controlling the feed motor 7 (step S6), and causes the tip 2a of the tool 2 to retract from the Z point to the R point via the W point. When the tip 2a of the tool 2 is retracted to the R point, the first canned cycle ends.

After the start of the first operation, the curvature calculating unit 14 calculates a radius of curvature r2 for a subsequent canned cycle (step S7 to step S11). In detail, the curvature calculating unit 14 reads a positioning command for the subsequent canned cycle from the canned cycle program 11b (step S7), calculates a movement distance L2 of the tool 2 to a subsequent drilling position (step S8), and calculates the radius of curvature r2 based on the movement distance L2 and the retraction distance |R−W| (step S9 to step S11). The calculation of the radius of curvature r2 ends before the tip 2a of the ascending tool 2 reaches the W point.

Then, the control unit 12 causes the machine tool 10 to execute a second canned cycle (step SS13 and steps S4 to S6). In this case, the control unit 12 starts the first operation in the second canned cycle before the third operation in the first canned cycle ends (step S4). The start timing of the first operation is controlled based on the radius of curvature r2. Specifically, if the radius of curvature r2 is greater than or equal to the retraction distance |R−W|, the first operation starts simultaneously as the tip 2a of the ascending tool 2 passes the W point, and the tip 2a of the tool 2 moves along the curved path e from the W point to the R point. If the radius of curvature r2 is smaller than the retraction distance |R−W|, the first operation starts when the distance from the tip 2a to the R point in the Z direction becomes equal to the radius of curvature r2 after the tip 2a of the ascending tool 2 has passed the W point. Specifically, the tip 2a of the tool 2 moves from the W point along a linear path, and subsequently moves to the R point along the curved path e.

Subsequently, the control unit 12 starts the second operation before the first operation ends (step S5). The start timing for the second operation is controlled based on the radius of curvature r2. Specifically, if the radius of curvature r2 is greater than or equal to the retraction distance |R−W|, the second operation starts when the distance from the tool 2 to the drilling position in the XY direction becomes equal to the radius of curvature r2, and the tip 2a of the tool 2 moves along the curved path b from the R point to the W point. If the radius of curvature r2 is smaller than the retraction distance |R−W|, the second operation starts simultaneously with the end of the third operation, and the tip 2a of the tool 2 moves along the curved path b from the R point to a position higher than the W point and subsequently moves along a linear path to the Z point via the W point.

The control unit 12 executes the third operation in the second canned cycle similarly to that in the first canned cycle, and further executes a third canned cycle. In the third operation in the third canned cycle, the control unit 12 causes the tip of the tool 2 to move along a linear path from the Z point to the R point via the W point, and ends the third canned cycle.

Figure 7:
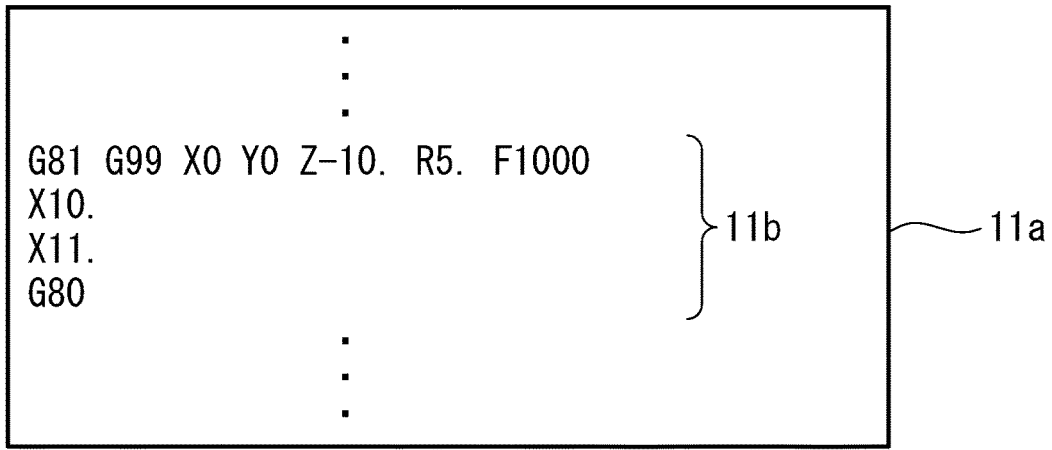
FIG. 7 illustrates an example of a drilling canned cycle program in the related art.
Figure 8:
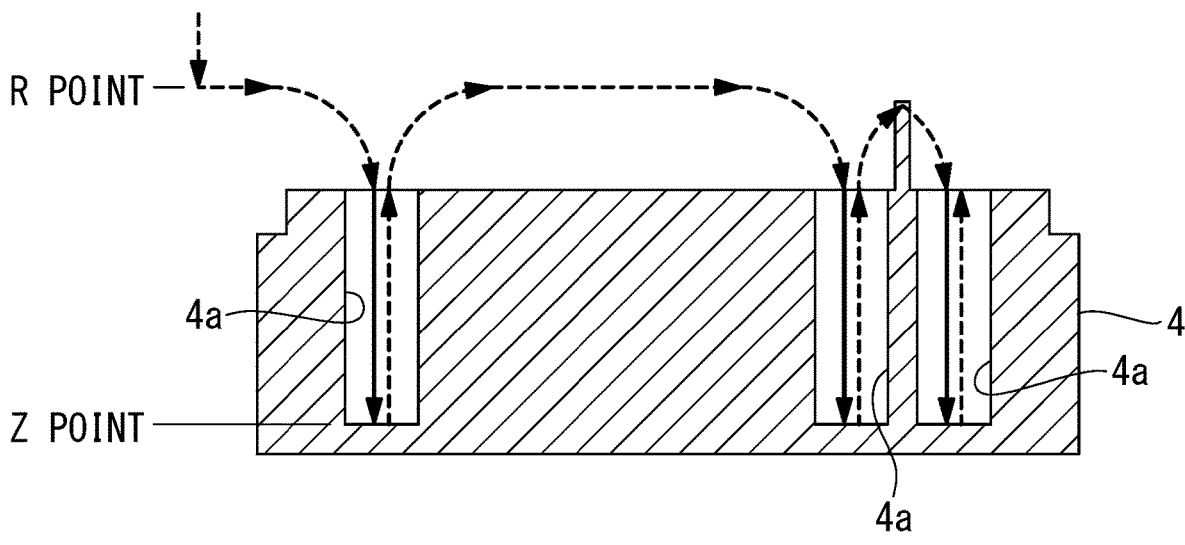
FIG. 8 illustrates an example of a drilling process according to a drilling canned cycle in the related art.

FIGS. 7 and 8 illustrate a drilling canned cycle in the related art. As shown in FIG. 8, the canned cycle program 11b in the related art does not include a command related to the W point, and the radius of curvature rn of a curved path is determined in accordance with a set overlap amount. Specifically, as shown in FIG. 8, the tip 2a of the tool 2 moves along a curved path having a fixed radius of curvature determined in accordance with the set overlap amount. Therefore, if the movement distance Ln to a subsequent drilling position is small in a state where an overlap amount optimal for the height of a certain R point is set, the tip 2a of the tool 2 starts to descend before it has ascended to the R point. The height at the upper surface of the workpiece 4 is not necessarily uniform. The upper surface of the workpiece 4 may include an area higher than other areas, as in the case of a protrusion between a second drilling position and a third drilling position. Thus, the tool 2 may interfere with the workpiece 4 before the tool 2 has ascended to the R point.

In this embodiment, the command for the W point is added to the canned cycle program 11b, and the retraction distance |R−W| is calculated. Before the third operation in each canned cycle starts, a positioning command for a subsequent canned cycle is preliminarily read. Based on the movement distance Ln to a subsequent drilling position and the retraction distance |R−W|, the radius of curvature rn appropriate for each of the curved paths b and e in the subsequent canned cycle is automatically calculated.

Accordingly, the radius of curvature rn is calculated for each drilling position, so that the tip 2a of the tool 2 can be reliably retracted to the R point even when the movement distance Ln is small, thereby preventing the tool 2 from interfering with the workpiece 4 while moving to a subsequent drilling position.

Furthermore, since information to be preliminarily read is a positioning command for a subsequent canned cycle alone, the numerical value controller 1 does not require high reading performance. Specifically, regardless of the reading performance of the numerical value controller 1, a radius of curvature rn appropriate for each drilling position can be calculated.

In this embodiment, the curvature calculating unit 14 executes steps S7 to S11 for calculating a radius of curvature for a subsequent canned cycle after the table 5 starts moving in the first operation. However, the timing for executing step S7 to S11 is not limited to this. Specifically, steps S7 to S11 may be executed at any timing so long as the calculation of the radius of curvature is completed before the tip 2a of the tool 2 reaches the W point in the third operation.

In this embodiment, an operator may be allowed to modify the canned cycle program 11b.

In one example, a radius-of-curvature correction command may be added to the canned cycle program 11b. As shown in FIG. 5, an example of the correction command is a command for designating a multiplying factor P of the radius of curvature. The multiplying factor P is set between 0% and 100%. The multiplying factor P may be settable for each drilling position. As indicated in step S10' and step S11' in FIG. 6, the curvature calculating unit 14 corrects the radius of curvature by multiplying it by the multiplying factor P, and the control unit 12 controls the movement path of the tool 2 based on the corrected radius of curvature rn. With the addition of such a correction command, the movement path of the tool 2 can be managed more finely.

Figure 6:
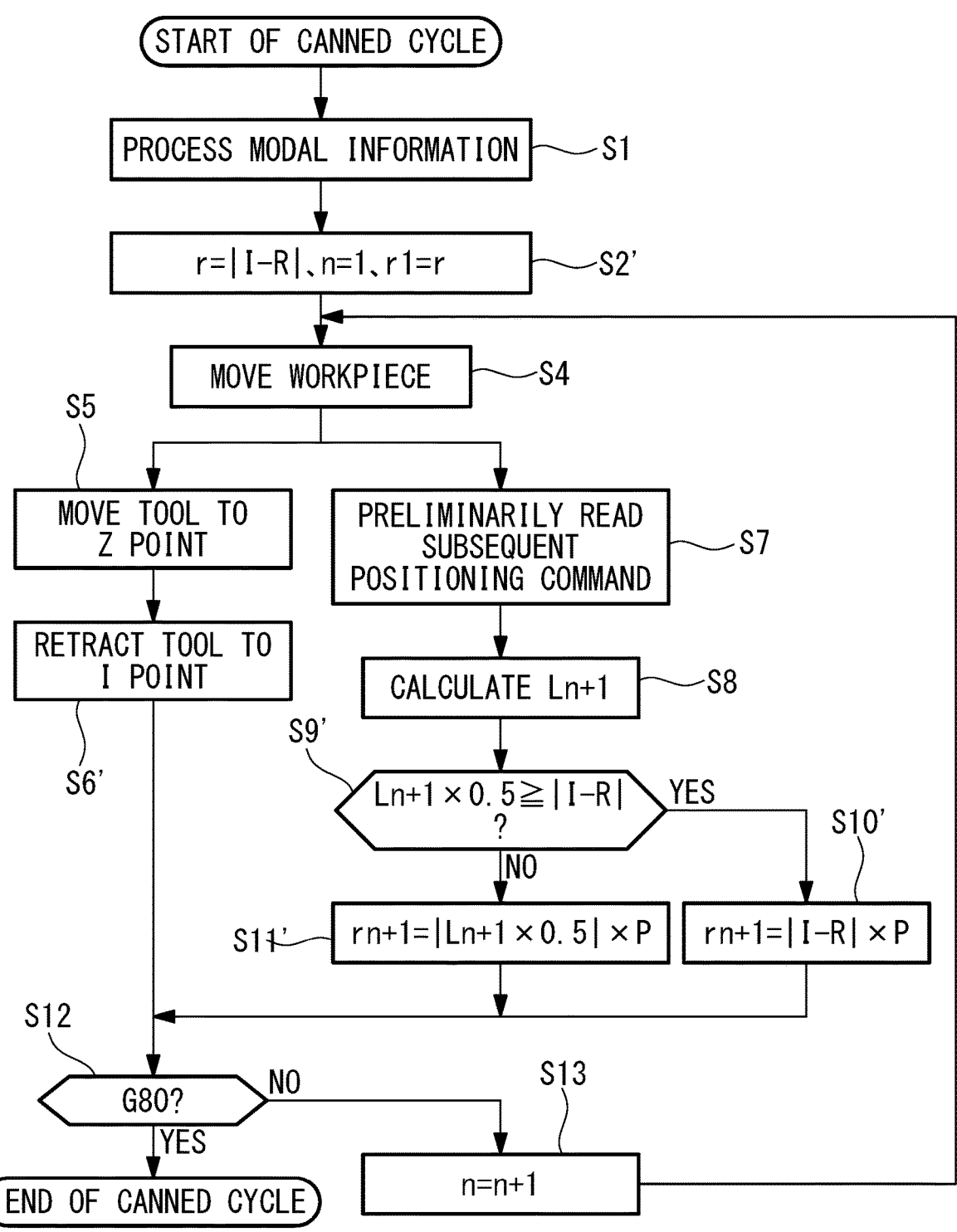
FIG. 6 is a flowchart illustrating a modification of the machine-tool control method.

As an alternative to this embodiment in which the return point is the R point (reference point), the return point may be an initial point (I point). Specifically, as shown in FIGS. 5 and 6, an initial-point return mode based on G98 that involves returning the tip 2a of the tool 2 to the initial point may be used instead of the R-point return mode based on G99. The initial point is the position of the tip 2a in the Z direction at the time when the canned cycle program 11b starts, and is retracted from the workpiece 4 in the Z direction relative to the R point. For example, in a case where the R point is Z=5 mm, the initial point is Z=100 mm. The tool 2 located at the initial point is separated from the workpiece 4 and the jig by a sufficient distance. In the case of the initial-position return mode, the tip 2a of the tool 2 moves to the initial point in step S6' of the third operation, as shown in FIG. 6.

If the initial-point return mode is to be used, the retraction distance may be the distance between the R point and the initial point in the Z direction, as shown in FIG. 6. Specifically, a retraction distance |I−R| may be calculated as the maximum radius of curvature r in step S2', and |I−R| may be used as a criterion in step S9'. In this case, I denotes a command value for the initial point.

In this embodiment, the curvature calculating unit 14 calculates the radius of curvature rn for the second canned cycle and onward based on the retraction distance and the positioning command. In addition, the curvature calculating unit 14 may calculate a radius of curvature r1 for the first canned cycle based on at least one of the retraction distance and the positioning command.

For example, the calculation of the radius of curvature r1 is executed between the positioning to the R point (step S3) and the positioning to the drilling position (step S4). For example, as the radius of curvature r1, the curvature calculating unit 14 may calculate the retraction distance |R−W| between the R point and the W point in the Z direction, or may calculate the radius of curvature r1 based on a movement distance L1, in the XY direction, from the position of the tool 2 at the start of the canned cycle program 11b to the drilling position in the first canned cycle. In the case of the initial-point return mode, the curvature calculating unit 14 may calculate the distance between the initial point and the R point in the Z direction as the radius of curvature r1.

As an alternative to this embodiment in which the control unit 12 moves the tool 2 and the workpiece 4 relative to each other at a rapid traverse rate along the curved paths b and e, the control unit 12 may move the tool 2 and the workpiece 4 relative to each other at a rate lower than the rapid traverse rate. The moving rate of the tool 2 along the curved paths b and e may be changeable between the cutting feed rate and the rapid traverse rate.

For example, as shown in FIG. 5, an argument L that designates a speed ratio between a cutting feed rate $F_C$ and a rapid traverse rate $F_R$ may be added to the canned cycle program 11b. L denotes a value ranging between 0% and 100%. A moving rate F of the tool 2 is defined by the following expression.

$$F=F_C\times(1-(L/100))+F_R\times L/100$$

By setting the value of L, the operator can designate the rate F to any rate between the cutting feed rate and the rapid traverse rate.

As an alternative to this embodiment in which the curved paths b and e are circular-arc shaped and the amount of curvature is the radius of curvature, the curved paths b and e may have a shape other than the circular-arc shape, and the amount of curvature may be a parameter according to the shape of each curved path. For example, each curved path may be a part of an ellipse.

As an alternative to this embodiment in which the tool 2 is movable in the Z direction and the workpiece 4 is movable in the XY direction, the relative movement between the tool 2 and the workpiece 4 may be achieved in accordance with the movement of either one of or both of the tool 2 and the workpiece 4. For example, the spindle 3 may be movable in the XY direction, and the table 5 may be movable in the Z direction. As another alternative, one of the spindle 3 and the table 5 may be movable in three directions, namely, the X, Y, and Z directions.

Furthermore, as an alternative to this embodiment in which the first direction is the horizontal direction (XY direction) and the second direction is the vertical direction (Z direction), the first direction and the second direction may specifically be changeable, as appropriate, in accordance with the specifications of the machine tool. For example, in a case where the machine tool has the spindle 3 disposed in the horizontal direction, the second direction may be the horizontal direction and the first direction may be any direction intersecting the second direction.

As an alternative to this embodiment in which the tool 2 is movable in the Z direction and the workpiece 4 is movable in the XY direction, if the orientation of the tool 2 is changeable, the tool 2 and the workpiece 4 may be movable diagonally or horizontally. For example, in a case where an angle head to be used has the tool 2 attached in a tilted state to the spindle 3, the workpiece 4 may be machined by tilting the tool 2 in the horizontal direction.

The invention claimed is:

1. A numerical value controller for a machine tool that moves a tool relative to a workpiece in a first direction and a second direction to drill a hole in the workpiece from a surface of the workpiece by using the tool, the first direction extending along a longitudinal axis of the tool, the second direction intersecting the longitudinal axis of the tool, the numerical value controller comprising:

a memory that stores a machining program involving executing a plurality of canned cycles, each of the plurality of canned cycles including a first operation, a second operation, and a third operation, the first operation involving relatively moving the tool and the workpiece in the second direction to position a drilling position of the workpiece relative to the tool, the second operation involving relatively moving the tool and the workpiece in the first direction to move the tool from a return point retracted from the workpiece in the first direction to a hole bottom point, the third operation involving relatively moving the tool and the workpiece in the first direction to move the tool from the hole bottom point to the return point; and a processor configured to move the tool between a workpiece height point, which is a position of the surface of the workpiece in the first direction, and the return point along a first curved path by starting the second operation before the first operation ends in one canned cycle of the plurality of canned cycles and move the tool between the workpiece height point and the return point along a second curved path by starting the first operation in a subsequent canned cycle subsequent to the one canned cycle before the third operation ends in the one canned cycle, wherein the processor is configured to:

read a positioning command for the drilling position for the subsequent canned cycle from the machining program stored in the memory before the third operation in the one canned cycle starts to calculate a movement distance in the second direction from the drilling position in the one canned cycle to the drilling position in the subsequent canned cycle;

set a first value as a radius of curvature of each of the first curved path and the second curved path for the subsequent canned cycle in a case where half of the calculated movement distance is smaller than a retraction distance which is a distance between the workpiece height point and the return point in the first direction, the first value being calculated by multiplying the half of the calculated movement distance by a multiplying factor set in the machining program; and set a second value as the radius of curvature of each of the first curved path and the second curved path for the subsequent canned cycle in a case where the half of the calculated movement distance is greater than or equal to the retraction distance, the second value being calculated by multiplying the retraction distance by the multiplying factor.

2. The numerical value controller according to claim 1, wherein the processor is configured to move the tool along the first curved path and the second curved path at a rapid traverse rate.

3. The numerical value controller according to claim 1, wherein the processor is configured to move the tool along the first curved path and the second curved path at a rate between a rapid traverse rate and a cutting feed rate.

4. The numerical value controller according to claim 1, wherein a moving rate of the tool along the first curved path and the second curved path is changeable to any rate between a rapid traverse rate and a cutting feed rate.

5. The numerical value controller according to claim 1, wherein the processor is configured to calculate the radius of curvature of each of the first curved path and the second curved path for a first canned cycle based on at least one of the retraction distance and a positioning command for the drilling position in the first canned cycle.

6. The numerical value controller according to claim 1, wherein the multiplying factor is configured to be set for each drilling position.

* * * * *